US009829969B2

(12) United States Patent
Yang et al.

(10) Patent No.: US 9,829,969 B2
(45) Date of Patent: Nov. 28, 2017

(54) METHOD FOR DETERMINING BENT STATE OF ELECTRONIC DEVICE, ELECTRONIC DEVICE AND FLEXIBLE SCREEN

(71) Applicants: Beijing Lenovo Software Ltd, Beijing (CN); Lenovo (Beijing) Co., Ltd., Beijing (CN)

(72) Inventors: Guang Yang, Beijing (CN); Qian Zhao, Beijing (CN); Ke Shang, Beijing (CN); Quan Niu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 236 days.

(21) Appl. No.: 13/874,724

(22) Filed: May 1, 2013

(65) Prior Publication Data
US 2013/0293455 A1 Nov. 7, 2013

(30) Foreign Application Priority Data

May 4, 2012 (CN) .......................... 2012 1 0137998
May 8, 2012 (CN) .......................... 2012 1 0141001

(51) Int. Cl.
G06F 3/01 (2006.01)
G06F 3/0488 (2013.01)
G06F 1/16 (2006.01)

(52) U.S. Cl.
CPC .............. G06F 3/01 (2013.01); G06F 1/1652 (2013.01); G06F 3/0488 (2013.01)

(58) Field of Classification Search
CPC ........ G06F 1/1652; G06F 2203/04102; G09G 2380/02
See application file for complete search history.

(56) References Cited

U.S. PATENT DOCUMENTS

| 8,279,170 | B2 | 10/2012 | Sugahara |
| 8,581,859 | B2 | 11/2013 | Okumura et al. |
| 2006/0238494 | A1* | 10/2006 | Narayanaswami et al. .. 345/156 |
| 2008/0278461 | A1 | 11/2008 | Prat et al. |
| 2008/0303782 | A1 | 12/2008 | Grant et al. |

(Continued)

FOREIGN PATENT DOCUMENTS

| CN | 101782804 A | 7/2010 |
| CN | 102156566 A | 8/2011 |
| CN | 102436784 A | 5/2012 |

OTHER PUBLICATIONS

First Chinese Office Action regarding Application No. 201210141001.9 dated Aug. 26, 2015. Partial English translation provided by Unitalen Attorneys at Law.

(Continued)

*Primary Examiner* — Viet Pham
(74) *Attorney, Agent, or Firm* — Harness, Dickey & Pierce, P.L.C.

(57) ABSTRACT

A method for determining a bent state of an electronic device is disclosed. The electronic device includes a detecting device and a flexible screen. The method includes obtaining at least one parameter value, the at least one parameter value being obtained by the detecting device in the case that the flexible screen is bent; and determining a bent state of the flexible screen based on the at least one parameter value.

22 Claims, 6 Drawing Sheets

(56) References Cited

U.S. PATENT DOCUMENTS

| | | | |
|---|---|---|---|
| 2009/0085866 A1 | 4/2009 | Sugahara | |
| 2010/0045705 A1* | 2/2010 | Vertegaal et al. | 345/661 |
| 2010/0064536 A1* | 3/2010 | Caskey et al. | 33/303 |
| 2010/0164888 A1 | 7/2010 | Okumura et al. | |
| 2010/0284125 A1* | 11/2010 | Moon et al. | 361/305 |
| 2012/0038613 A1 | 2/2012 | Choi | |
| 2012/0092363 A1* | 4/2012 | Kim et al. | 345/618 |
| 2013/0135244 A1* | 5/2013 | Lynch et al. | 345/174 |
| 2013/0169520 A1* | 7/2013 | Cho et al. | 345/156 |

OTHER PUBLICATIONS

First Chinese Office Action regarding Application No. 201210137998.0 dated Apr. 23, 2015. English translation provided by Unitalen Attorneys at Law.

* cited by examiner

METHOD FOR DETERMINING BENT STATE OF ELECTRONIC DEVICE, ELECTRONIC DEVICE AND FLEXIBLE SCREEN

CROSS REFERENCE TO RELATED APPLICATIONS

This application claims the priorities of Chinese Patent Application No. 201210137998.0, entitled "FLEXIBLE SCREEN, METHOD FOR DETERMINING BENT STATE OF ELECTRONIC DEVICE AND ELECTRONIC DEVICE", filed with the Chinese Patent Office on May 4, 2012; and Chinese Patent Application No. 201210141001.9, entitled "INFORMATION OPERATION METHOD AND ELECTRONIC DEVICE", filed with the Chinese Patent Office on May 8, 2012, which are incorporated by reference in their entirety herein.

FIELD OF THE INVENTION

The invention relates to the fields of communication and electronics, and in particular to a method for determining a bent state of an electronic device, an electronic device and a flexible screen.

BACKGROUND OF THE INVENTION

With the developments of science and technology, various electronic devices enrich and facilitate people's lives increasingly. The use of the electronic device for processing information has many advantages, such as convenience, swiftness and resource saving, so that the electronic device has played an indispensable role in ordinary life and work.

With the demands for portability, ease of use, multi-use, etc. on device, flexible screens become more and more popular. However, many existing techniques related to the flexible screen have problems. For example, when the flexible screen is bent to different shapes, the electronic device with the flexible screen is operated as an electronic device having different status. Thus, it needs to determine the state of the flexible screen, when the electronic device is switched into different "electronic device", for different applications. However, the current state of the flexible screen can not be obtained automatically in the prior art, instead, it is judged manually, which greatly reduces efficiency, results in inaccurate judgment and is time-consuming.

Further, in the prior art, when an electronic device is rotated by a user, a display object displayed on the electronic device can perform a position adjustment that complies with gravity laws. For example, when a mobile phone is inclined with respect to the horizontal plane by a user, in an application loaded in the mobile phone, a roll ball will be moved along the inclined direction under the action of the gravity, so that the roll ball is moved according to the orientation in which the mobile phone is placed, and thus the user can gain better experience. With the increasing demand on the electronic device, a deformable electronic device applied a flexible screen technique has been proposed. A user can perform bend operation on the electronic device according to the deformable feature of the electronic device, as shown in FIG. 1 and FIG. 2, in which a display unit, i.e., a screen, is provided on a display plane of the electronic device. Then, a problem to be solved in the invention is that for the deformable electronic device, how the state of the display object will be adjusted according to the deformable feature of the electronic device, for improving the experience of the user.

SUMMARY OF THE INVENTION

A method for determining a bent state of an electronic device, the electronic device and a flexible screen are provided according to an embodiment of the invention, for detecting the bent state of the flexible screen, and improving the work efficiency and the accuracy of the judgment. Further, it can be achieved in the invention that the state of a display object can be adjusted according to the deformable feature of the electronic device, for further improving the experience of the user.

A method for determining a bent state of an electronic device, the electronic device including a flexible screen and a detecting device, and the method includes: obtaining at least one parameter value, wherein the at least one parameter value is obtained by the detecting device in the case that the flexible screen is bent; and determining a bent state of the flexible screen based on the at least one parameter value.

Preferably, the obtaining the at least one parameter value may include: obtaining the at least one parameter value in an active manner or a passive manner.

Preferably, the electronic device may further include a display unit, the detecting device is one or more sensing unit, and the obtaining at least one parameter value may include: obtaining data collected by the sensing unit; and determining current state information of the electronic device based on the collected data, the method may further include: determining first state information of one or more display object in the display unit; determining second state information of the display object based on the current state information of the electronic device and the first state information of the display object; and adjusting the state of the display object based on the determined second state information.

Preferably, the display unit may include a plurality of sub-regions, and the sensing unit may be provided under a central position of each sub-region.

Preferably, the sensing unit may be a gravity acceleration sensor.

Preferably, the collected data may include sub-acceleration data collected by the gravity acceleration sensor in directions of X-axis, Y-axis and Z-axis respectively, and the determining current state information of the electronic device based on the collected data may include: determining state information of a corresponding sub-region based on the collected sub-acceleration data; and determining the current state information of the electronic device based on the state information of the plurality of sub-regions.

Preferably, the display unit may include a plurality of sub-regions in a rectangular shape; and the sensing unit may be provided under each of four vertexes of each sub-region.

Preferably, the sensing unit may be a gravity acceleration sensor; the collected data may at least include sub-acceleration data collected by the gravity acceleration sensor in the directions of X-axis, Y-axis and Z-axis respectively; the determining the current state information of the electronic device based on the collected data may include: determining, based on the collected sub-acceleration data, angles of the vertexes of the corresponding sub-region with a horizontal plane; determining state information of a corresponding sub-region based on the determined angles of the vertexes of the corresponding sub-region with the horizontal plane; and determining the current state information of the electronic device based on the state information of the plurality of sub-regions.

Preferably, the state information of the display object may be a position point of the display object; and the adjusting the state of the display object based on the determined second state information may include: moving the display object from a first position point to a second position point based on the current state information of the electronic device, wherein the movement with respect to the current state information complies with physical laws.

Preferably, the state information of the display object may be display attribute information of the display object; and the adjusting the state of the display object based on the determined second state information may include: adjusting a first display attribute information of the display object to a second display attribute information that corresponds to the current state information of the electronic device.

An electronic device, includes a detecting device and a flexible screen, wherein the electronic device may further include: a obtaining module adapted to obtain at least one parameter value, wherein the at least one parameter value is obtained by the detecting device in the case that the flexible screen is bent; and a determining module adapted to determine a bent state of the flexible screen based on the at least one parameter value.

Preferably, the obtaining module may be adapted to obtain the at least one parameter value in an active manner or a passive manner.

Preferably, the detection device may be one or more sensing unit, and the electronic device further may include a display unit and a information processing device, the information processing device may include: a data obtaining module adapted to obtain data collected by the sensing unit; a current status determining module adapted to determine current state information of the electronic device based on the collected data; a first state determining module adapted to determine first state information of one or more display object in the display unit; a second state determining module adapted to determine second state information of the display object based on the current state information and the first state information; and a state adjusting module adapted to adjust the state of the display object based on the determined second state information.

Preferably, the display unit may include a plurality of sub-regions, and a sensing unit may be provided under a central position of each sub-region.

Preferably, the sensing unit may be a gravity acceleration sensor, the data obtaining module may include: a sub-acceleration obtaining unit adapted to obtain sub-acceleration data collected by the gravity acceleration sensor in the directions of X-axis, Y-axis and Z-axis respectively, the current status determining module may include: a sub-region status determining unit adapted to determine state information of a corresponding sub-region based on the collected sub-acceleration data; and an electronic device status determining unit adapted to determine the current state information of the electronic device based on the state information of the plurality of sub-regions.

Preferably, the display unit may include a plurality of sub-regions in a rectangular shape; and a sensing unit may be provided under each of four vertexes of each sub-region.

Preferably, the sensing unit may be a gravity acceleration sensor, the data obtaining module may include: a sub-acceleration obtaining unit adapted to obtain sub-acceleration data collected by the gravity acceleration sensor in the directions of X-axis, Y-axis and Z-axis respectively, the current status determining module may include: a vertex inclination angle determining unit adapted to determine, based on the collected sub-acceleration data, angles of the vertexes of the corresponding sub-region with a horizontal plane; a sub-region status determining unit adapted to determine state information of a corresponding sub-region based on the determined angles of the vertexes of the corresponding sub-region with the horizontal plane; and an electronic device status determining unit adapted to determine the current state information of the electronic device based on the state information of the plurality of sub-regions.

Preferably, the first state determining module may include: a position point determining unit adapted to determine a first position point of one or more display object in the display unit, and the state adjusting module may include: a position point adjusting unit adapted to move the display object from the first position point to a second position point based on the current state information of the electronic device, wherein the movement with respect to the current state information complies with physical laws.

Preferably, the first state determining module may include: a first display attribute determining unit adapted to determine a first display attribute information of one or more display object in the display unit, and the state adjusting module may include: a display attribute adjusting unit adapted to adjust the first display attribute information of the display object to a second display attribute information that corresponds to the current state information of the electronic device.

A flexible screen, including a basic device and a detecting device, wherein the basic device includes a basic layer and a light-emitting layer applied on the basic layer; and the detecting device is provided on the basic device or in the basic device, and is adapted to detect at least one parameter value in the case that the flexible screen is bent, wherein the at least one parameter value is a parameter value used to determine a bent state of the flexible screen.

Preferably, the basic device further may include a protection layer applied on the light-emitting layer.

Preferably, the detecting device may be a piezoelectric device adapted to detect a pressure variation value in a bending process of the flexible screen.

Preferably, in the bending process of the flexible screen, the piezoelectric device may be adapted to detect pressure variation values in a bent region and determine the bent state of the flexible screen based on the pressure variation values.

Preferably, the detecting device may be a capacitive device adapted to detect a capacitance variation value in the bending process of the flexible screen.

Preferably, in the bending process of the flexible screen, the capacitive device may be adapted to detect capacitance variation values in a bent region and determine the bent state of the flexible screen based on the capacitance variation values.

Preferably, the capacitive device may include a first nanometer Indium Tin Oxide (ITO) layer with positive charges and a second nanometer ITO layer with negative charges; if the light-emitting layer has no dielectricity, the first ITO layer and the second ITO layer may be applied in any position on the basic layer; and if the light-emitting layer has dielectricity, the first ITO layer and the second ITO layer may be applied under the basic layer.

With the method for determining a bent state of an electronic device according to the invention, the bent state of the deformed electronic device, such as the bent state of the flexible screen, can be detected, thereby the work efficiency and the accuracy of the judgment are improved.

Further, in the invention, the state information of the display object is further determined based on the bend information, and finally the display object is adjusted based on the state information of the display object. Thus, the state of the display object is adjusted as the electronic device is deformed, and the experience of the user is improved.

Moreover, a flexible screen is further provided according to the invention. The flexible screen includes a basic device and a detecting device which is adapted to determine a bent state. By detecting the bent state, the work efficiency and the accuracy of the judgment are improved. Further, the flexible screen can be configured to output different contents according to different bent states of the flexible screen, for improving the quality of the output and facilitating the usage.

BRIEF DESCRIPTION OF THE DRAWINGS

In order to illustrate the technical solutions according to the embodiments of the present invention or in the prior art more clearly, drawings to be used in the description of the prior art or the embodiments will be described briefly hereinafter. Apparently, the drawings described hereinafter are only some embodiments of the present invention, and other drawings may be obtained by those skilled in the art according to those drawings without creative labor.

DETAILED DESCRIPTION OF THE INVENTION

Hereinafter, the technical solution in the embodiment of the present invention will be described clearly and completely in conjunction with the drawings in the embodiment of the present invention. Obviously, the described embodiments are only a part of the embodiments of the present invention, but not all the embodiments. All the other embodiments obtained by those skilled in the art based on the embodiment in the present invention without invention efforts will fall within the scope of protection of the present invention.

Hereinafter, a method for determining a bent state of an electronic device according to an embodiment of the invention will be described by specific flows.

Figure 3:
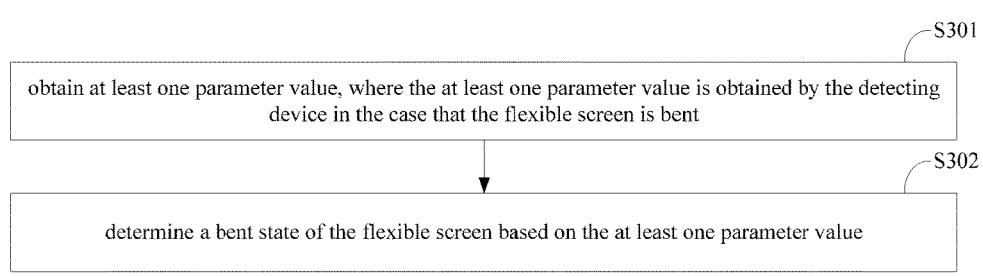
FIG. 3 is a flow chart of a method for determining a bent state of an electronic device according to a first embodiment of the invention.

FIG. 3 shows a flow of a method for determining a bent state of an electronic device according to a first embodiment of the invention. The electronic device includes a flexible screen and a detecting device, and the method includes steps S301 to S302.

S301: obtaining at least one parameter value, the at least one parameter value being obtained by the detecting device when the flexible screen is bent.

S302: determining a bent state of the flexible screen based on the at least one parameter value.

Specifically, the obtaining the at least one parameter value includes: obtaining the at least one parameter value in an active manner or a passive manner.

In a second embodiment of the invention, based on the method according to the first embodiment, an information processing method is provided, for adjusting a state of a display object as the electronic device is deformed, and thus improving the experience of the user. Specifically, after the parameter value (referred to as state information of the electronic device in the second embodiment) for indicating the bent state of the electronic device is determined by the method shown in FIG. 3, the display object is adjusted according to the state information of the display object.

Figure 1:
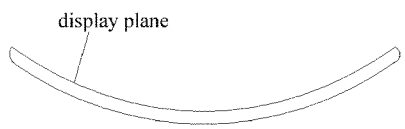
FIG. 1 is a schematic diagram of a deformation of a deformed electronic device in the prior art.
Figure 2:
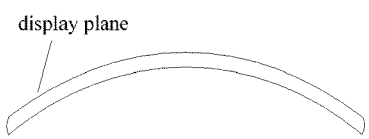
FIG. 2 is a schematic diagram of another deformation of a deformed electronic device in the prior art.

It is to be noted that the information processing method according to the second embodiment can be applied in a deformable electronic device which includes a display unit and multiple sensing units. For example, the electronic device can be a mobile phone, a panel computer and the like that can be deformed and include a display unit and multiple sensing units. The electronic device can be deformed refers to that the electronic device can at least perform the bend operations as shown in FIG. 1 and FIG. 2 under the operation of a user, which is not limited to those operations. It can be easily understood by those skilled that for the electronic device, the screen is a flexible screen, the backboard is made of flexible material such as rubber, and the internal circuit board is a flexible circuit board.

Figure 4:
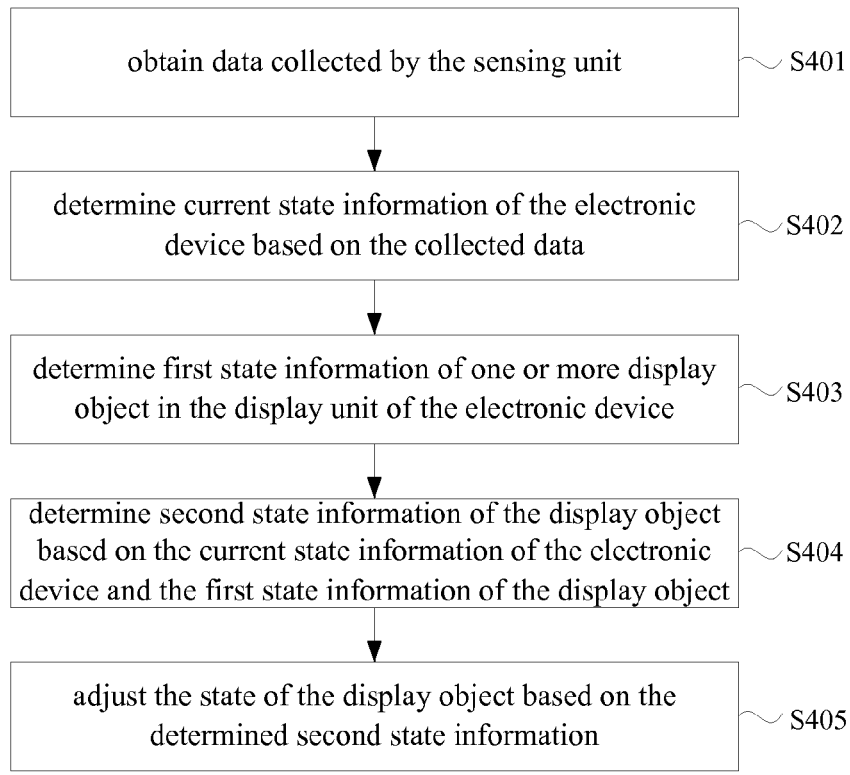
FIG. 4 is a schematic diagram of a first flow of an information processing method according to a second embodiment of the invention.

FIG. 4 is a schematic diagram of a first flow of an information processing method according to a second embodiment of the invention. The first flow includes steps S401 to S405.

S401: obtaining data collected by the sensing unit.

S402: determining current state information of the electronic device based on the collected data.

When the electronic device is deformed under the operation of the user, the multiple sensing units provided in the electronic device will collect data related to the deformation. Thus, the electronic device can obtain the data collected by the sensing units and determine the current state information of the electronic device based on the collected data. The current state information can be a bend manner of the electronic device or an angle of the electronic device with a horizontal plane.

It is to be noted that in order to determine the current state information of the electronic device, the display unit of the electronic device can be divided into multiple sub-regions, and a sensing unit can be provided at a corresponding position under the sub-region, so as to determine, based on the data collected by the sensing unit, the state information of the sub-region in which the sensing unit is provided, and thus to determine the current state information of the electronic device based on the state information of the multiple sub-regions. For example, the display unit of the electronic device is divided into multiple sub-regions, and a sensing unit is provided under a central position of each sub-region. Alternatively, the display unit of the electronic device is divided into multiple sub-regions in a rectangular shape, and a sensing unit is provided under each of four vertexes of each sub-region.

It can be understood that in practice, the position of the sensing unit provided under the sub-region is not limited to the position described in this embodiment, but can be other set positions selected based on the amount of the sub-regions, the shape of the sub-region and the like, as long as the state information of the sub-region can be determined. For example, when the sub-region is in a hexagonal shape, a sensing unit can be provided under each of the six vertexes of the hexagon or on a central point of each of the six sides of the hexagon, which are all reasonable.

Further, the sensing unit can be a gravity acceleration sensor or any other sensor that can determine the state information of the electronic device, such as a Hall sensor, a pressure sensor and a resistance sensor.

It can be understood that the data collected by the sensing unit is determined by the kind of the sensor.

S403: determining first state information of one or more display object in the display unit of the electronic device.

Specifically, the state information of the display object can be a position point of the display object, display attribute information of the display object, or the like. The display attribute information of the display object can be a display resolution, a direction, a color value or the like.

When the electronic device is deformed, it is necessary to determine first state information of one or more display object being displayed in the display unit of the electronic device. The first state information can be the current position point of the display object, the current display attribute information of the display object or the like when the electronic device is deformed.

It is to be noted that the order for determining the current state information and the first state information of the display object is not limited to the order described in this embodiment. For example, when the electronic device is deformed, the first state information of the one or more display object being displayed in the display unit of the electronic device can be determined at first, and then the current state information of the electronic device can be determined. Alternatively, when the electronic device is deformed, the first state information of the one or more display object being displayed in the display unit of the electronic device and the current state information of the electronic device can be determined at the same time.

S404: determining second state information of the display object based on the current state information of the electronic device and the first state information of the display object.

After the current state information of the electronic device and the first state information of the display object are determined, second state information of the display object can be determined in a certain way. The second state information is the corresponding position point of the display object, the display attribute information of the display object or the like after the electronic device is deformed.

It can be understood that for different kinds of state information of the display object, the second state information of the display object can be determined in different ways. For example, if the state information of the display object is the position point, it is necessary to determine a second position point of the display object corresponding to a first position point based on the physical laws when the current state information is obtained by the electronic device; and if the state information of the display object is the display attribute information, it is necessary to determine a second display attribute information of the display object corresponding to a first display attribute information based on the relationship between a preset state information of the electronic device and the display attribute information of the display object when the current state information is obtained by the electronic device, which are both reasonable.

S405: adjusting the state of the display object based on the determined second state information.

After the second state information of the display object is determined, the state of the display object can be adjusted, so that the state information of the display object corresponds to the current state information of the electronic device.

Specifically, when the state information of the display object is the position point of the display object, the adjusting the state of the display object based on the determined second state information can include:

moving the display object from a first position point to a second position point based on the current state information of the electronic device, wherein the movement with respect to the current state information complies with physical laws.

It can be understood that the physical laws can be gravity laws. For example, when the display object is a roll ball of an application, the roll ball will be moved from a first position point to a second position point under the action of the gravity when the electronic device is deformed.

Specifically, when the state information of the display object is the display attribute information of the display object, the adjusting the state of the display object based on the determined second state information can include:

adjusting a first display attribute information of the display object to a second display attribute information that corresponds to the current state information of the electronic device.

For example, when the electronic device is to be deformed, the current display object is a picture which has a first resolution; and after the electronic device is deformed, the resolution of the picture will be adjusted from the first resolution to a second resolution that corresponds to the current state information of the electronic device, so as to zoom the displayed picture by the deformation of the electronic device.

In the technical solution according to the embodiment of the invention, the electronic device can be deformed and include the display unit and multiple sensing units. When the electronic device is deformed, the current state information of the electronic device is determined based on the data collected by the sensing units; the first state information of the one or more display objects in the display unit is determined; further, the second state information of the display object is determined based on the current state information of the electronic device and the first state information of the display object, and the state of the display object is adjusted based on the second state information of the display object, so that the state of the display object is adjusted as the electronic device is deformed, and the experience of the user is improved.

The information processing method according to the second embodiment of the invention will be described by taking how to adjust the state of a roll ball in an application as the electronic device is deformed as an example.

Figure 5:
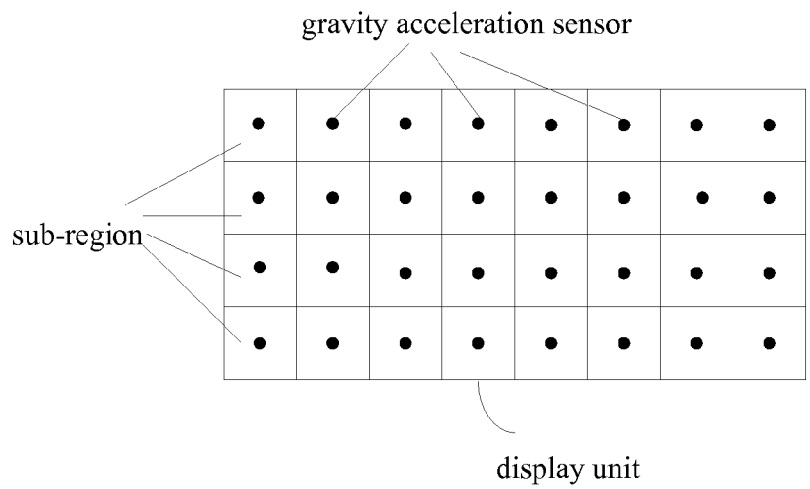
FIG. 5 is a schematic structural diagram of a display unit under which multiple gravity acceleration sensors are provided according to the second embodiment of the invention.

It is to be noted that the information processing method according to the second embodiment can be applied in a deformable electronic device, which includes a display unit divided into multiple sub-regions. A gravity acceleration sensor is provided under a central position of each of the multiple sub-regions. FIG. 5 is a schematic structural diagram of a display unit under which multiple gravity acceleration sensors are provided according to the second embodiment of the invention. The display unit includes multiple sub-regions, and a gravity acceleration sensor is provided under a central position of each of the multiple sub-regions.

Figure 6:
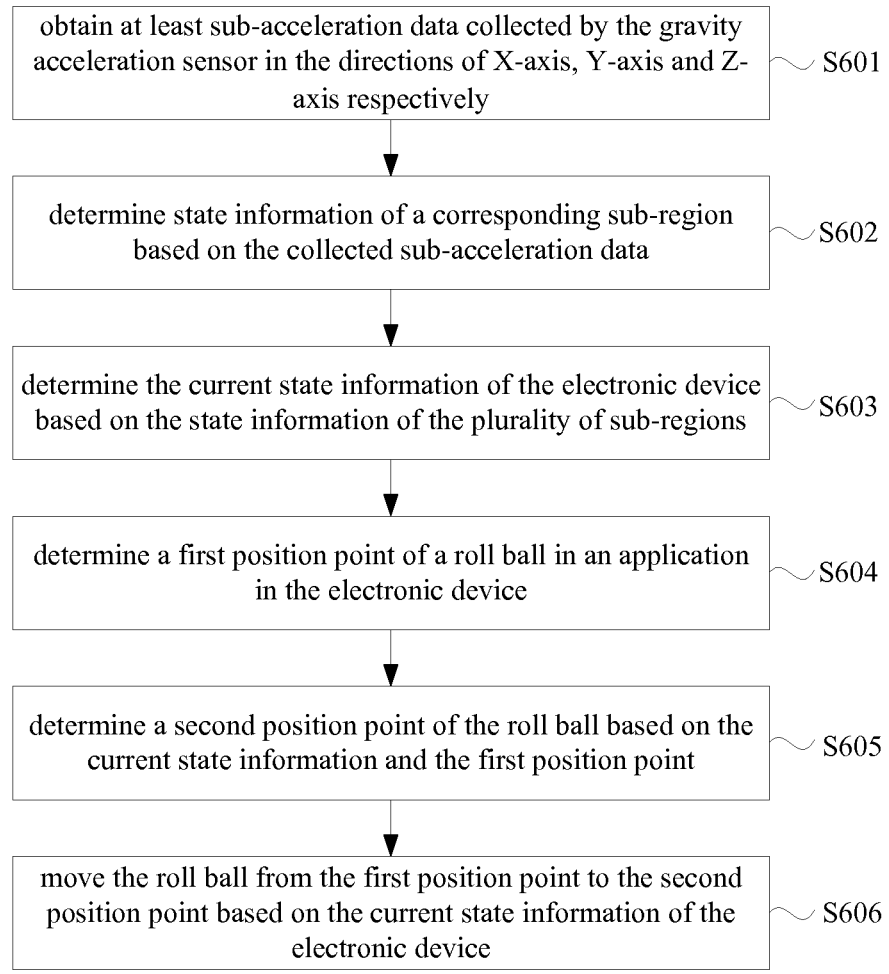
FIG. 6 is a schematic diagram of a second flow of an information processing method according to the second embodiment of the invention.

FIG. 6 is a schematic diagram of a second flow of an information processing method according to the second embodiment of the invention. The second flow includes steps S601 to S606.

S601: obtaining sub-acceleration data collected by the gravity acceleration sensor in the directions of X-axis, Y-axis and Z-axis respectively.

S602: determining state information of a corresponding sub-region based on the collected sub-acceleration data.

Specifically, for a sub-region, the state information of a sub-region, i.e., the angle of the sub-region with a horizontal plane, can be determined based on the sub-acceleration data collected by the gravity acceleration sensor in the directions of X-axis, Y-axis and Z-axis respectively. The way in which the gravity acceleration sensor determines the state information of the sub-region is similar to that in which the gravity acceleration sensor determines the inclined angle of the electronic device in the prior art, and will not be described in detail herein.

S603: determining the current state information of the electronic device based on the state information of the plurality of sub-regions.

The display unit of the electronic device is divided into multiple sub-regions, so that the state information of the sub-region has a contribution value for the current state information of the electronic device. Therefore, after the state information of each of the sub-regions is determined, the state information of the sub-regions can be gathered, and the current state information of the electronic device can be determined by analyzing and processing the gathered state information of the sub-regions.

S604: determining a first position point of a roll ball in an application in the electronic device.

Specifically, the first position point of the roll ball is the position point of the roll ball when the electronic device is to be deformed.

S605: determining a second position point of the roll ball based on the current state information and the first position point.

Specifically, after the current state information of the electronic device and the first position point of the roll ball are determined, in the case that the electronic device has the current state information, a second position point corresponding to the roll ball on the first position point can be determined using the gravity laws.

S606: moving the roll ball from the first position point to the second position point based on the current state information of the electronic device.

Figure 7:
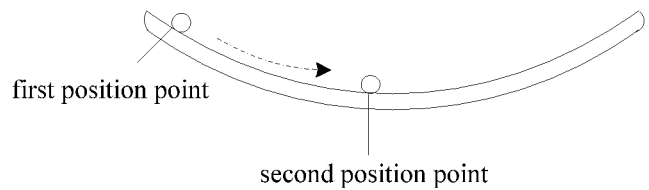
FIG. 7 is a schematic diagram of a movement of a roll ball under the action of the gravity according to the second embodiment of the invention.

Specifically, the movement with respect to the current state information complies with physical laws. The physical laws can be but not limited to the gravity laws. FIG. 7 is a schematic diagram of a manner in which a roll ball is moved under the action of the gravity according to the second embodiment of the invention. As shown in FIG. 7, when the electronic device is in the shown bent status, the roll ball can be moved from the first position point to the second position point. In this case, the movement of the roll ball with respect to the current state information complies with physical laws.

In the second embodiment, a roll ball is provided in an application in an electronic device. When the electronic device is deformed, the current state information of the electronic device can be determined by a gravity acceleration sensor provided under the central point of each of the multiple sub-regions in the display unit, the second position point of the roll ball is determined based on the current state information and the first position point of the roll ball, and thus the roll ball is moved from the first position point to the second position point based on the current state information of the electronic device, so that the status of the electronic device is adjusted based on the state of the roll ball, and the experience of the user is improved.

Hereinafter, the information processing method according to the second embodiment of the invention will be described by taking how to adjust the state of a picture as the electronic device is deformed as an example.

Figure 8:
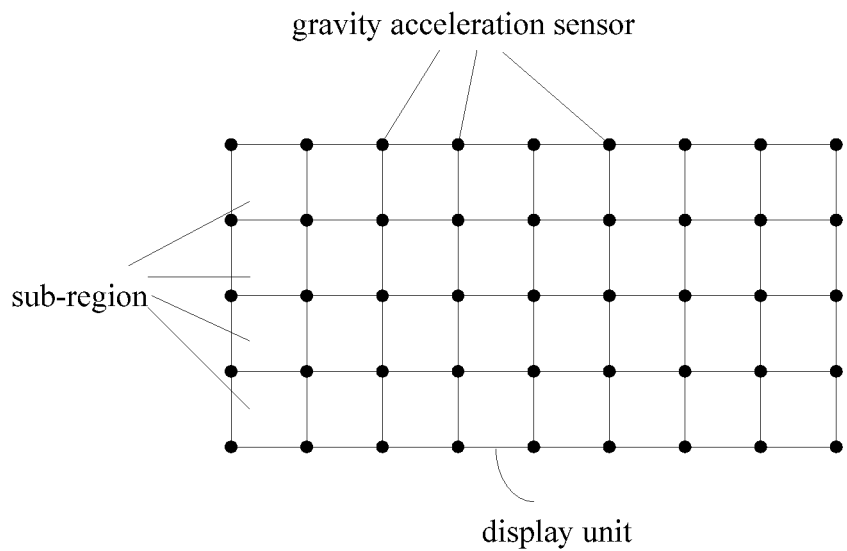
FIG. 8 is another schematic structural diagram of a display unit under which multiple gravity acceleration sensors are provided according to the second embodiment of the invention.

It is to be noted that the information processing method according to the second embodiment can be applied in a deformable electronic device, which includes a display unit divided into multiple sub-regions in a rectangular shape. A gravity acceleration sensor is provided under each of four vertexes of each sub-region. FIG. 8 is another schematic structural diagram of a display unit under which multiple gravity acceleration sensors are provided according to the second embodiment of the invention. The display unit includes multiple sub-regions, and a gravity acceleration sensor is provided under each of four vertexes of each sub-region.

Figure 9:
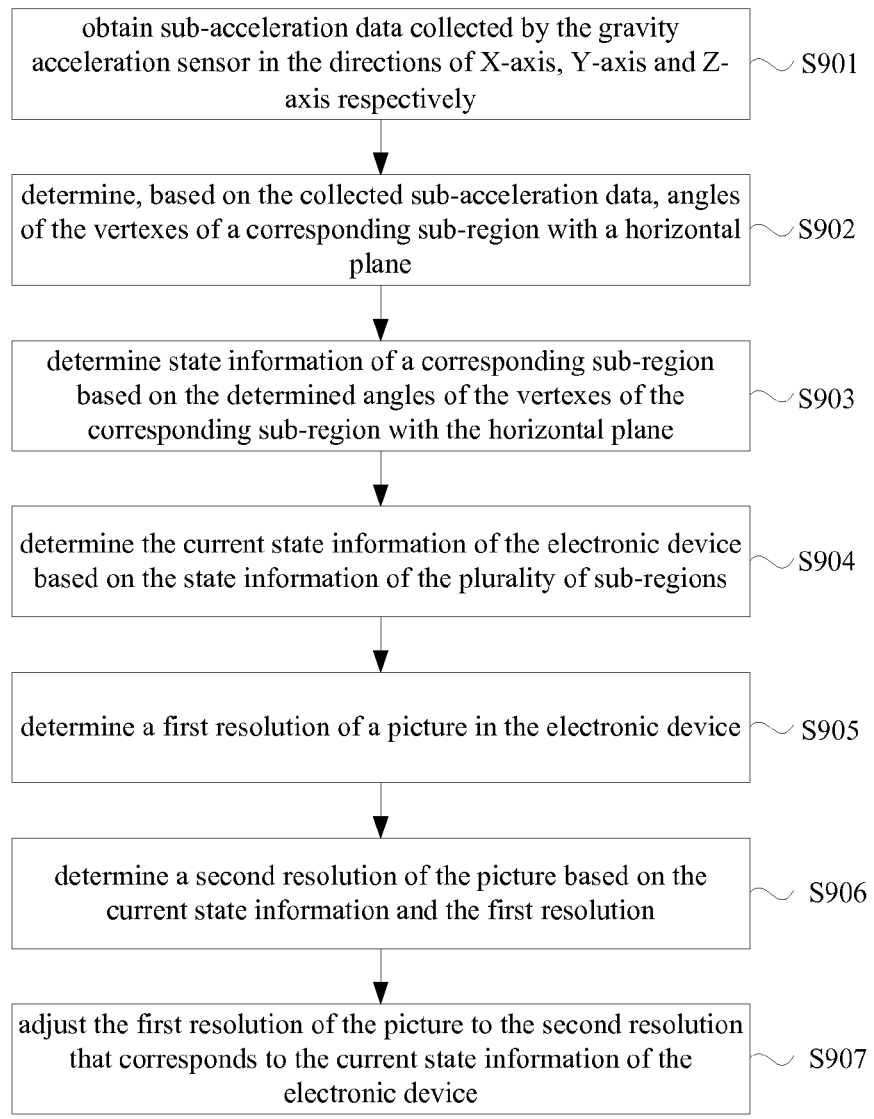
FIG. 9 is a schematic diagram of a third flow of an information processing method according to the second embodiment of the invention.

FIG. 9 is a schematic diagram of a third flow of an information processing method according to the second embodiment of the invention. The third flow includes steps S901 to S907.

S901: obtaining sub-acceleration data collected by the gravity acceleration sensor in the directions of X-axis, Y-axis and Z-axis respectively.

S902: determining, based on the collected sub-acceleration data, an angle of the vertexes of the corresponding sub-region with a horizontal plane.

S903: determining state information of a corresponding sub-region based on the determined angle of the vertexes of the corresponding sub-region with the horizontal plane.

The sub-region in the display unit includes four vertexes, so that the angles of the four vertexes with respect to the horizontal plane have contribution values to the state information of the sub-region. Therefore, in order to determine the state information of the sub-region more accurately, a gravity acceleration sensor can be provided on each of the four vertexes of the sub-region. The angles of the four vertexes of a corresponding sub-region with the horizontal plane can be determined based on the acceleration data collected by the gravity acceleration sensors, and then the state information of the corresponding sub-region can be determined based on the determined inclined angles.

Specifically, the way in which the gravity acceleration sensor determines the state information of the sub-region is similar to that in which the gravity acceleration sensor determines the inclined angle of the electronic device in the prior art, and will not be described in detail herein.

S904: determining the current state information of the electronic device based on the state information of the plurality of sub-regions.

The display unit of the electronic device is divided into multiple sub-regions, so that the state information of the sub-region has a certain contribution value to the current state information of the electronic device. Therefore, after the state information of each of the sub-regions is determined, the state information of the sub-regions can be gathered, and the current state information of the electronic device can be determined by analyzing and processing the gathered state information of the sub-regions.

S905: determining a first resolution of a picture in the electronic device.

Specifically, the first resolution of the picture is the current resolution of the picture when the electronic device is to be deformed.

S906: determining a second resolution of the picture based on the current state information and the first resolution.

Specifically, after the current state information of the electronic device and the first resolution of the picture are determined, in the case that the electronic device obtains the current state information, a corresponding second resolution of the picture having the first resolution can be determined based on a corresponding relationship between the state information of the electronic device and the resolution of the picture.

S907: adjusting the first resolution of the picture as the second resolution that corresponds to the current state information of the electronic device.

In the second embodiment, a picture is displayed in a display unit of an electronic device; and when the electronic device is deformed, the current state information of the electronic device can be determined by gravity acceleration sensors provided under the vertexes of each of the multiple sub-regions in the display unit, the second resolution of the picture is determined based on the current state information and the first resolution of the picture, and thus the first resolution of the picture is adjusted to the second resolution that corresponds to the current state information of the electronic device, so that the state of the picture is adjusted based on the status of the electronic device, and the experience of the user is improved.

Figure 10:
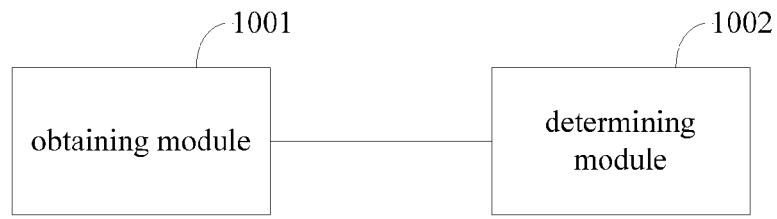
FIG. 10 is a schematic structural diagram of an electronic device according to a third embodiment of the invention.
Figure 11:
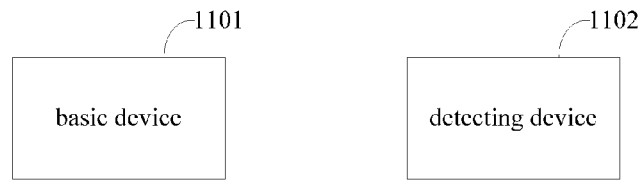
FIG. 11 is a schematic structural diagram of a flexible screen according to the third embodiment of the invention.

FIG. 10 is a schematic structural diagram of an electronic device according to a third embodiment of the invention. The solution of the electronic device corresponds to the solution of the method according to the first embodiment. The electronic device can include an obtaining module 1001 and a determining module 1002. The electronic device can be connected to a flexible screen. The flexible screen can be provided on the electronic device, or be separated from the electronic device. FIG. 11 is a schematic structural diagram of a flexible screen. As shown in FIG. 11, the flexible screen includes a basic device 1101 and a detecting device 1102.

The obtaining module 1001 is adapted to obtain at least one parameter value. The at least one parameter value is obtained by the detecting device 1102 when the flexible screen is bent.

If the detecting device 1102 is a piezoelectric device, the parameter value can be the pressure value obtained by each piezo film. For example, when there are three detection points in the flexible screen in total, each detection point is provided with a piezo film, i.e., a first piezo film, a second piezo film and a third piezo film respectively, each of the piezo films can have an identifier, and the identifier can corresponds to the position of the piezo film, so that the electronic device can known that the pressure value is obtained by which piezo film. The parameter value is the pressure value obtained by each piezo film. The flexible screen can transmit the parameter information to the electronic device periodically. At a first time instant, the flexible screen transmits to the electronic device a first pressure value collected by the first piezo film, a second pressure value collected by the second pizeo film and a third pressure value collected by the third piezo film; and at a second time instant, the flexible screen transmits to the electronic device a fourth pressure value collected by the first piezo film, a fifth pressure value collected by the second pizeo film and a sixth pressure value collected by the third piezo film. The electronic device can determine whether the fourth pressure value is equal to the first pressure value, whether the fifth pressure value is equal to the second pressure value, and whether the sixth pressure value is equal to the third pressure value, respectively. If any one of the results of the above three determinations is unequal, it can be determined that the flexible screen is bent, and the bent angle of the flexible screen can be determined based on the pressure variation values.

If the detecting device 1102 is the piezoelectric device, the parameter value can be the pressure variation value obtained by each piezo film. For example, if there are three detection points in the flexible screen in total, each detection point is provided with a piezo film, i.e., a first piezo film, a second piezo film and a third piezo film respectively, each of the piezo films can have an identifier, and the identifier can corresponds to the position of the piezo film, so that the electronic device can known that the pressure variation value is obtained is which piezo film. The parameter value is the pressure variation value obtained by each piezo film. The flexible screen can transmit the parameter information to the electronic device periodically. At a first time instant, the flexible screen transmits to the electronic device a first pressure variation value collected by the first piezo film, a second variation pressure value collected by the second pizeo film and a third variation pressure value collected by the third piezo film. The electronic device can determine whether the first pressure variation value, the second pressure variation value and the third pressure variation value are all equal to zero. If any one of the above pressure variation values is not equal to zero, it can be determined that the flexible screen is bent, and the bent angle of the flexible screen can be determined based on the pressure variation value that is not equal to zero.

If the detecting device 1102 is a capacitive device, the parameter value can be a capacitance obtained by each capacitor. For example, if there are three detection points in the flexible screen in total, each detection point is provided with a capacitor, that is, a first capacitor, a second capacitor and a third capacitor respectively, each of the capacitors can have an identifier, and the identifier can corresponds to the position of the capacitor, so that the electronic device can known that the pressure value is obtained by which capacitor. The parameter value is the capacitance obtained by each capacitor. The flexible screen can transmit the parameter information to the electronic device periodically. At a first time instant, the flexible screen transmits to the electronic device a first capacitance collected by the first capacitor, a second capacitance collected by the second capacitor and a third capacitance collected by the third capacitor; and at a second time instant, the flexible screen transmits to the electronic device a fourth capacitance collected by the first capacitor, a fifth capacitance collected by the second capacitor and a sixth capacitance collected by the third capacitor.

The electronic device determines whether the fourth capacitance is equal to the first capacitance, whether the fifth capacitance is equal to the second capacitance, and whether the sixth capacitance is equal to the third capacitance, respectively. If any one of the results of the above three determination is unequal, it can be determined that the flexible screen is bent, and the bent angle of the flexible screen can be determined based on a capacitance variation value.

If the detecting device 1102 is a capacitive device, the parameter value can be the capacitance variation value obtained by each capacitor. For example, if there are three detection points in the flexible screen in total, each detection point is provided with a capacitor, that is, a first capacitor, a second capacitor and a third capacitor respectively, each of the capacitors can have an identifier, and the identifier can corresponds to the position of the capacitor, so that the electronic device can known that the capacitance variation value is obtained by which capacitor. The parameter value is the capacitance variation value obtained by each capacitor, and the flexible screen can transmit the parameter information to the electronic device periodically. At a first time instant, the flexible screen transmits to the electronic device a first capacitance variation value collected by the first capacitor, a second capacitance variation value collected by the second capacitor and a third capacitance variation value collected by the third capacitor. The electronic device can determine whether the first capacitance variation value, the second capacitance variation value and the third capacitance variation value are all equal to zero. If any one of the above capacitance variation values is not equal to zero, it can be determined that the flexible screen is bent, and the bent angle of the flexible screen is can be determined based on the capacitance variation value that is not equal to zero.

The determining module 1002 is adapted to determine a bent state of the flexible screen based on the at least one parameter value. The determining module 1002 can determine the bent state of the flexible screen based on the pressure variation value or the capacitance variation value.

Figure 12:
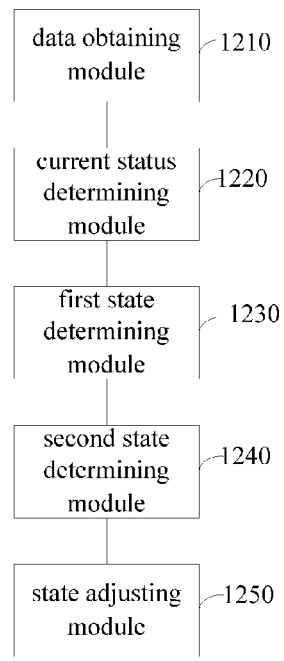
FIG. 12 is a schematic structural diagram of an information processing device according to a fourth embodiment of the invention.

Based on the electronic device according to the third embodiment of the invention, an electronic device including an information processing device is provided according to a fourth embodiment of the invention. The solution of the electronic device including the information processing device corresponds to the solution of the above method according to the second embodiment. The electronic device is deformable and further includes a display unit and multiple sensing units. The above detecting device includes one or more sensing units. FIG. 12 is a schematic structural diagram of an information processing device. The information processing device includes a data obtaining module 1210, a current status determining module 1220, a first state determining module 1230, a second state determining module 1240 and a state adjusting module 1250.

The data obtaining module 1210 is adapted to obtain data collected by the sensing unit.

The current status determining module 1220 is adapted to determine current state information of the electronic device based on the collected data.

The first state determining module 1230 is adapted to determine first state information of one or more display object in the display unit.

The second state determining module 1240 is adapted to determine second state information of the display object based on the current state information and the first state information.

The state adjusting module 1250 is adapted to adjust the state of the display object based on the determined second state information.

The electronic device in which the information processing device according to the embodiment of the invention can be applied is deformable and includes a display unit and multiple sensing units. When the electronic device is deformed, the information processing device determines the current state information of the electronic device based on the data collected by the sensing units; determines the first state information of one or more display object in the display unit; determines the second state information of the display object based on the current state information and the first state information; and adjusts the state of the display object based on the second state information of the display object. Thus, the state of the display object is adjusted as the electronic device is deformed, and the experience of the user is improved.

Specifically, the display unit includes multiple sub-regions, and a sensing unit is provided under the central position of each of the sub-regions.

Specifically, the sensing unit can be a gravity acceleration sensor.

Accordingly, the data obtaining module 1210 can include:

a sub-acceleration obtaining unit adapted to obtain sub-acceleration data collected by the gravity acceleration sensor in the directions of X-axis, Y-axis and Z-axis respectively.

The current status determining module 1220 can include:

a sub-region status determining unit adapted to determine state information of a corresponding sub-region based on the obtained sub-acceleration data; and an electronic device status determining unit adapted to determine the current state information of the electronic device based on the state information of multiple sub-regions.

Specifically, the display unit includes multiple sub-regions in a rectangular shape; and a sensing unit is provided under each of four vertexes of each sub-region.

Specifically, the sensing unit can be a gravity acceleration sensor.

Accordingly, the data obtaining module 1210 may include:

a sub-acceleration obtaining unit adapted to obtain sub-acceleration data collected by the gravity acceleration sensor in the directions of X-axis, Y-axis and Z-axis respectively.

The current status determining module 1220 may include:

a vertex inclination angle determining unit adapted to determine, based on the obtained sub-acceleration data, angles of the vertexes of the corresponding sub-region with a horizontal plane;

a sub-region status determining unit adapted to determine state information of a corresponding sub-region based on the determined angles of the vertexes of the corresponding sub-region with the horizontal plane; and an electronic device status determining unit adapted to determine the current state information of the electronic device based on the state information of multiple sub-regions.

Specifically, the first state determining module 1230 may include:

a position point determining unit adapted to determine a first position point of one or more display object in the display unit; and the state adjusting module 1240 may include:

a position point adjusting unit adapted to move the display object from the first position point to a second position point based on the current state information of the electronic device, wherein the movement with respect to the current state information complies with physical laws.

Specifically, the first state determining module 1230 may include:

a first display attribute determining unit adapted to determine first display attribute information of one or more display object in the display unit; and the state adjusting module 1240 may include:

a display attribute adjusting unit adapted to adjust the first display attribute information of the display object to a second display attribute information that corresponds to the current state information of the electronic device.

The electronic device according to the fourth embodiment of the invention can be deformed and include the display unit and multiple sensing units. When the electronic device is deformed, the current state information of the electronic device is determined based on the data collected by the sensing units; the first state information of the one or more display objects in the display unit is determined; further, the second state information of the display object is determined based on the current state information and the first state information, and the state of the display object is adjusted based on the second state information, so that the state of the display object is adjusted as the electronic device is deformed, and thus the experience of the user is improved.

Finally, the flexible screen according to the embodiment of the invention will be described. As described referring to FIG. 11, the flexible screen according to the embodiment of the invention includes a basic device 1101 and a detecting device 1102. The basic device includes a basic layer and a light-emitting layer applied on the basic layer. The detecting device is provided on the basic device or in the basic device, and is adapted to detect at least one parameter value when the flexible screen is bent. The at least one parameter value is a parameter value for determining a bent state of the flexible screen. The flexible screen according to the embodiment of the invention includes a detecting device adapted to detect at least one parameter value when the flexible screen is bent. Based on the at least one parameter value, the bent state of the flexible screen can be determined, so as to improve the work efficiency and the accuracy of the judgment. Further, the flexible screen can be configured to output different contents based on different bent states of the flexible screen, such that the quality of the output is improved, and the usage by the user is facilitated.

Figure 13:
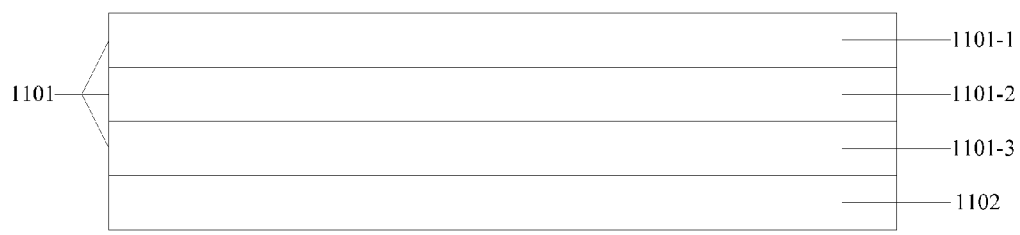
FIG. 13 is a schematic structural diagram of details of the flexible screen in FIG. 11.

As shown in FIG. 13, the basic device 1101 can include a basic layer 1101-1 and a light-emitting layer 1101-2. The light-emitting layer 1101-2 can be applied on the basic layer 1101-1. The light-emitting layer 1101-2 can be composed of Organic Light-Emitting Diode (OLED). The basic device 1101 can further include a protection layer 1101-3 applied on the light-emitting layer 1101-2.

The detecting device 1102 is provided on the basic device 1101 or in the basic device 1101, and is adapted to detect at least one parameter value when the flexible screen is bent. Specifically, the at least one parameter value is a parameter value for determining a bent state of the flexible screen. The detecting device 1102 can be multiple detectors distributed on the basic device 1101 or in the basic device 1101 separately, or can be a layer of detectors. As an example, the detecting device 1102 in FIG. 12 is a layer of detectors, and the layer of detectors is applied under the basic layer 1101-1.

After the detection, the detecting device 1102 transmits the detection result to the electronic device connected to the flexible screen. The electronic device can determine the bent state of the flexible screen based on the detection result. Specifically, the detecting device 1102 can perform the transmission periodically, instantly or after being triggered. The electronic device can obtain at least one parameter value in an active manner or a passive manner.

In the embodiment of the invention, the detecting device 1102 can be a piezoelectric device. For example, the detector can be a piezo film (piezoelectric sensor), and the detecting device 1102 can be composed of at least one piezo films. In this case, the detecting device 1102 can be used to obtain the pressure variation value of the flexible screen when the flexible screen is bent. For example, when the flexible screen is not bent, the detecting device 1102 detects the pressure value on a detecting point as a first pressure value. When the flexible screen is bent, the detecting device 1102 detects the pressure value on the detecting point as a second pressure value. The pressure variation value of the flexible screen during the bending of the flexible screen can be obtained based on the first pressure value and the second pressure value. For example, the pressure variation value of the flexible screen during the bending of the flexible screen can be obtained by subtracting the first pressure value from the second pressure value. When the flexible screen is bent, the pressure value on the bent region will be varied, and the detecting point with the maximum pressure variation value can be the detecting point with the maximum bending. More far away from this detecting point, the smaller the pressure variation value. The electronic device connected to the flexible screen can determine the bent state of the flexible screen based on a series of pressure variation values.

The piezoelectric device can be multiple detectors distributed on the basic device 1101 or in the basic device 1101 separately. For example, multiple piezo films can be distributed in the basic device 1101 separately. For example, the multiple piezo films can be distributed in a line in the basic device 1101; or the multiple piezo films can be distributed in different positions in the basic device 1101; or the multiple piezo films can form a layer of detectors, and then the detecting device 1102 is a detecting layer.

If the multiple piezo films are distributed in the basic device 1101 separately, the multiple piezo films can be distributed on the basic layer 1101-1, on the light-emitting layer 1101-2, on the protection layer 1101-3 or under the basic layer 1101-1, respectively. That is to say, the distribution position can be provided arbitrarily. Preferably, the distribution position can achieve the best detection effect. For example, one piezo film is provided on each horizontal detecting point, and the piezo films can be in different horizontal planes. In this way, the variation of the pressure value at each horizontal detecting point can be detected in time, and the timeliness and accuracy of the detection are improved.

If the multiple piezo films form a layer of detectors, the detecting device 1102 is a detecting layer, the layer of detectors can be distributed on the basic layer 1101-1, on the light-emitting layer 1101-2, on the protection layer 1101-3 or under the basic layer 1101-1, respectively, that is to say, the distribution position can be provided arbitrarily.

If the detecting device 1102 is a piezoelectric device, the detecting device 1102 transmits to the electronic device a first pressure value detected by each piezo film when the flexible screen is not bent and a second pressure value detected by each piezo film when the flexible screen is bent. The electronic device obtains a pressure variation value of the detecting point based on the first pressure value and the second pressure value, and then determines the bent state of the flexible screen based on the obtained pressure variation value. Alternatively, the detecting device 1102 can obtain the pressure variation value of the detecting point based on the first pressure value and the second pressure value, and then transmit the pressure variation value to the electronic device, and the electronic device can determine the bent state of the flexible screen based on a series of pressure variation values. The electronic device can request the detecting device 1102 for the first and second pressure values or various pressure variation values periodically, instantly or when being triggered. Alternatively, the detecting device 1102 can transmit in an initiative manner to the electronic device the first and second pressure values or various pressure variation values periodically, instantly or when being triggered.

Alternatively, in the embodiment of the invention, the detecting device 1102 can be a capacitive device. For example, the detector can be a capacitor, the detecting device 1102 can be composed of at least one capacitor. In this case, the detecting device 1102 can be used to obtain the capacitance variation value of the flexible screen when the flexible screen is bent. For example, when the flexible screen is not bent, the detecting device 1102 detects the capacitance on a detecting point as a first capacitance; and when the flexible screen is bent, the detecting device 1102 detects the capacitance on the detecting point as a second capacitance. The capacitance variation value of the flexible screen when the flexible screen is bent can be obtained based on the first capacitance and the second capacitance. For example, the capacitance variation value of the flexible screen when the flexible screen is bent can be obtained by subtracting the first capacitance from the second capacitance. When the flexible screen is bent, the capacitance on the bent region will be varied, and the detecting point with the maximum capacitance variation value can be the detecting point with the maximum bending. More far away from this detecting point, the smaller the capacitance variation value. The electronic device connected to the flexible screen can determine the bent state of the flexible screen based on a series of capacitance variation values.

The capacitive device can be multiple detectors distributed on the basic device 1101 or in the basic device 1101 separately. For example, multiple capacitors can be distributed in the basic device 1101 separately. For example, the multiple capacitors can be distributed in a line in the basic device 1101; or the multiple capacitors can be distributed in different positions in the basic device 1101; or the multiple capacitors can form a layer of detectors, and then the detecting device 1102 is a detecting layer; or the multiple capacitors can form two layer of detectors, and then the detecting device 1102 is still a detecting layer.

If the multiple capacitors are distributed in the basic device 1101 separately, it is necessary to consider whether the light-emitting layer 1101-2 has dielectricity. If the light-emitting layer 1101-2 has dielectricity, the capacitor can not be provided on the light-emitting layer 1101-2, for avoiding the influence on the light-emitting performance. That is to say, if the light-emitting layer 1101-2 has dielectricity, the capacitors can be distributed under the basic layer 1101-1, and if the light-emitting layer 1101-2 has no dielectricity, the capacitors can be distributed on/under the basic layer 1101-1, on/under the light-emitting layer 1101-2, and on/under the protection layer 1101-3, that is, the distribution position can be provided arbitrarily. Preferably, the distribution position can achieve the best detection effect. For example, one capacitor is provided on each horizontal detecting point, the capacitors can be in different horizontal planes, so that the variation of the capacitance at each horizontal detecting point can be detected in time, and the timeliness and accuracy of the detection are improved.

If the multiple capacitors form a layer of detectors, the detecting device 1102 is a detecting layer. Firstly, it is necessary to consider whether the light-emitting layer 1101-2 has dielectricity. If the light-emitting layer 1101-2 has dielectricity, the capacitor can be provided under the light-emitting layer 1101-2. If the light-emitting layer 1101-2 has no dielectricity, the capacitors can be distributed on the basic layer 1101-1, on the light-emitting layer 1101-2, and on/under the protection layer 1101-3, that is, the distribution position can be provided arbitrarily.

In the embodiment of the invention, if the multiple capacitors form two layers of detectors, and the two layers of detectors can include a first nanometer Indium Tin Oxide layer (ITO) with positive charges and a second nanometer ITO layer with negative charges. If the light-emitting layer 1101-2 has no dielectricity, the first ITO layer and the second ITO layer can be applied on the basic layer 1101-1, on the light-emitting layer 1101-2, on the protection layer 1101-3 or under the basic layer 1101-1, that is, the distribution position can be provided arbitrarily; and the first ITO layer and the second ITO layer is unnecessarily to be provided on the same layer. For example, the first ITO layer can be distributed on the light-emitting layer 1101-2, and the second ITO layer can be distributed under the basic layer 1101-1. Alternatively, the first ITO layer can be distributed on the protection layer 1101-3, and the second ITO layer can be distributed on the light-emitting layer 1101-2, or the like. If the light-emitting layer 1101-2 has dielectricity, the first ITO layer and the second ITO layer each can be applied under the basic layer 1101-1. For example, the first ITO layer can be distributed under the basic layer 1101-1, and the second ITO layer can be distributed under the first ITO layer.

If the detecting device 1102 is a capacitive device, the detecting device 1102 transmits to the electronic device the first capacitance detected by the capacitor when the flexible screen is not bent and the second capacitance detected by the capacitor when the flexible screen is bent. The electronic device obtains the capacitance variation value of the detecting point based on the first capacitance and the second capacitance, and then determines the bent state of the flexible screen based on the obtained capacitance variation values. Alternatively, the detecting device 1102 can obtain the capacitance variation value of the detecting point based on the first capacitance and the second capacitance, and then transmit the capacitance variation value to the electronic device, and the electronic device can determine the bent state of the flexible screen based on a series of capacitance variation values. The electronic device can request the detecting device 1102 for the first and second capacitances or various capacitance variation values periodically, instantly or when being triggered. Alternatively, the detecting device 1102 can transmit in an initiative manner to the electronic device the first and second capacitances or various capacitance variation values periodically, instantly or when being triggered.

The method for determining the bent state of the flexible screen according to the embodiment of the invention will be described by way of several specific examples.

First Example

The electronic device is connected to the flexible screen in a wireless manner, and the flexible screen and the electronic device are distributed separately. The flexible screen includes a basic layer 1101-1, a light-emitting layer 1101-2, a protection layer 1101-3 and a detecting device 1102.

The detecting device 1102 is a piezoelectric device, and includes three piezo films, i.e., a first piezo film, a second piezo film and a third piezo film, which are distributed in the basic device 1101 dispersedly. Specifically, the first piezo film is distributed on the protection layer 1101-3, the second piezo film is distributed on the light-emitting layer 1101-2, and the third piezo film is distributed on the basic layer 1101-1.

The detecting device 1102 transmits periodically to the electronic device information. The information may be a pressure value collected by each piezo film.

At a first time instant, the detecting device 1102 transmits to the electronic device a first pressure value collected by the first piezo film, a second pressure value collected by the second piezo film and a third pressure value collected by the third piezo film. At a second time instant, the detecting device 1102 transmits to the electronic device a fourth pressure value collected by the first piezo film, a fifth pressure value collected by the second piezo film and a sixth pressure value collected by the third piezo film. The electronic device determines whether the fourth pressure value is equal to the first pressure value, whether the fifth pressure value is equal to the second pressure value, and whether the sixth pressure value is equal to the third pressure value, respectively. If each of the result of the above three determinations is equal, it can be determined that the flexible screen is not bent. At a third time instant, the detecting device 1102 transmits to the electronic device a seventh pressure value collected by the first piezo film, a eighth pressure value collected by the second pizeo film and a ninth pressure value collected by the third piezo film. The electronic device determines whether the seventh pressure value is equal to the fourth pressure value (or the first pressure value), whether the eighth pressure value is equal to the fifth pressure value (or the second pressure value), and whether the ninth pressure value is equal to the sixth pressure value (or the third pressure value), respectively. If any one of the result of the above three determinations is unequal, it can be determined that the flexible screen is bent, and a bent angle of the flexible screen can be determined based on the pressure variation values.

Second Example

The electronic device is connected to the flexible screen in a wired manner, and the flexible screen and the electronic device are distributed separately. The flexible screen includes a basic layer 1101-1, a light-emitting layer 1101-2, a protection layer 1101-3 and a detecting device 1102.

The detecting device 1102 is a piezoelectric device, and includes three piezo films, i.e., a first piezo film, a second piezo film and a third piezo film, which are distributed in the basic device 1101 dispersedly. Specifically, the first piezo film is distributed on the light-emitting layer 1101-2, the second piezo film is distributed on the protection layer 1101-3, and the third piezo film is distributed under the basic layer 1101-1.

The detecting device 1102 transmits instantly to the electronic device information. The information may be a pressure variation value collected by each piezo film.

At a first time instant, the first piezo film collects a first pressure value, the second piezo film collects a second pressure value, and the third piezo film collects a third pressure value. At a second instant, the first piezo film collects a fourth pressure value, the second piezo film collects a fifth pressure value, and the third piezo film collects a sixth pressure value. The first piezo film obtains a first pressure variation value based on the first pressure value and the fourth pressure value, the second piezo film obtains a second pressure variation value based on the second pressure value and the fifth pressure value, and the third piezo film obtains a third pressure variation value based on the third pressure value and the sixth pressure value. The detecting device 1102 transmits to the electronic device the first pressure variation value, the second pressure variation value and the third pressure variation value. The electronic device determines whether the first pressure variation value, the second pressure variation value and the third pressure variation value are all equal to zero. The determined result is that the first pressure variation value, the second pressure variation value and the third pressure variation value are all equal to zero. At a third time instant, the first piezo film collects a seventh pressure value, the second piezo film collects an eighth pressure value, and the third piezo film collects a ninth pressure value. The first piezo film obtains a fourth pressure variation value based on the seventh pressure value and the fourth pressure value (or the first pressure value), the second piezo film obtains a fifth pressure variation value based on the eight pressure value and the fifth pressure value (or the second pressure value), and the third piezo film obtains a sixth pressure variation value based on the ninth pressure value and the sixth pressure value (or the third pressure value). The detecting device 1102 transmits to the electronic device the fourth pressure variation value, the fifth pressure variation value and the sixth pressure variation value. The electronic device determines whether the fourth pressure variation value, the fifth pressure variation value and the sixth pressure variation value are all equal to zero. The determined result is that the fourth pressure variation value is equal to zero, and the fifth and sixth pressure variation values are both not equal to zero. In this case, it can be determined that the pressure at the detecting point on the flexible screen is varied, and that the flexible screen is bent. The electronic device can determine the bent state of the flexible screen based on the fifth pressure variation value and the sixth pressure variation value.

Third Example

The electronic device is connected to the flexible screen in a wireless manner, and the flexible screen is provided on the electronic device. The flexible screen includes a basic layer 1101-1, a light-emitting layer 1101-2, a protection layer 1101-3 and a detecting device 1102.

The detecting device 1102 is a piezoelectric device, and includes three piezo films, i.e., a first piezo film, a second piezo film and a third piezo film, which form a detecting layer under the basic layer 1101-1.

The detecting device 1102 when being triggered transmits to the electronic device information. The information may be a pressure variation value collected by each piezo film.

At a first time instant, the first piezo film collects a first pressure value, the second piezo film collects a second pressure value, and the third piezo film collects a third pressure value. At a second instant, the first piezo film collects a fourth pressure value, the second piezo film collects a fifth pressure value, and the third piezo film collects a sixth pressure value. The first piezo film obtains a first pressure variation value based on the first pressure value and the fourth pressure value, the second piezo film obtains a second pressure variation value based on the second pressure value and the fifth pressure value, and the third piezo film obtains a third pressure variation value based on the third pressure value and the sixth pressure value. The detecting device 1102 transmits to the electronic device the first pressure variation value, the second pressure variation value and the third pressure variation value. The electronic device determines whether the first pressure variation value, the second pressure variation value and the third pressure variation value are all equal to zero. The determined result is that the first pressure variation value, the second pressure variation value and the third pressure variation value are all equal to zero. At a third time instant, the first piezo film collects a seventh pressure value, the second piezo film collects an eighth pressure value, and the third piezo film collects a ninth pressure value. The first piezo film obtains a fourth pressure variation value based on the seventh pressure value and the fourth pressure value (or the first pressure value), the second piezo film obtains a fifth pressure variation value based on the eight pressure value and the fifth pressure value (or the second pressure value), and the third piezo film obtains a sixth pressure variation value based on the ninth pressure value and the sixth pressure value (or the third pressure value). The detecting device 1102 transmits to the electronic device the fourth pressure variation value, the fifth pressure variation value and the sixth pressure variation value. The electronic device determines whether the fourth pressure variation value, the fifth pressure variation value and the sixth pressure variation value are all equal to zero. The determined result is that the fourth pressure variation value is equal to zero, and the fifth pressure variation value and the sixth pressure variation value are both not equal to zero. In this case, it can be determined that the pressure at the detecting point on the flexible screen is varied, and that the flexible screen is bent. The electronic device can determine the bent state of the flexible screen based on the fifth pressure variation value and the sixth pressure variation value.

Fourth Example

The electronic device is connected to the flexible screen in a wired manner, and the flexible screen is provided on the electronic device. The flexible screen includes a basic layer 1101-1, a light-emitting layer 1101-2, a protection layer 1101-3 and a detecting device 1102. The light-emitting layer 1101-2 in this embodiment has no dielectricity.

The detecting device 1102 is a capacitive device, and includes three capacitors, i.e., a first capacitor, a second capacitor and a third capacitor, which are distributed in the basic device 1101 dispersedly. Specifically, the first capacitor is distributed on the light-emitting layer 1101-2, the second capacitor is distributed on the protection layer 1101-3, and the third capacitor is distributed under the basic layer 1101-1.

The detecting device 1102 when being triggered transmits to the electronic device information. The information may be a capacitance collected by each capacitor.

At a first time instant, the detecting device 1102 transmits to the electronic device a first capacitance collected by the first capacitor, a second capacitance collected by the second capacitor and a third capacitance collected by the third capacitor. At a second time instant, the detecting device 1102 transmits to the electronic device a fourth capacitance collected by the first capacitor, a fifth capacitance collected by the second capacitor and a sixth capacitance collected by the third capacitor. The electronic device determines whether the fourth capacitance is equal to the first capacitance, whether the fifth capacitance is equal to the second capacitance, and whether the sixth capacitance is equal to the third capacitance. If each of the results of the above three determinations is equal, it can be determined that the flexible screen is not bent. At a third time instant, the detecting device 1102 transmits to the electronic device a seventh capacitance collected by the first capacitor, an eighth capacitance collected by the second capacitor and a ninth capacitance collected by the third capacitor. The electronic device determines whether the seventh capacitance is equal to the fourth capacitance (or the first capacitance), whether the eighth capacitance is equal to the fifth capacitance (or the second capacitance), and whether the ninth capacitance is equal to the sixth capacitance (or the third capacitance). If any one of the results of the above three determinations is unequal, it can be determined that the flexible screen is bent, and the bent angle of the flexible screen can be determined based on the capacitance variation values.

Fifth Example

The electronic device is connected to the flexible screen in a wireless manner, and the flexible screen is provided on the electronic device. The flexible screen includes a basic layer 1101-1, a light-emitting layer 1101-2, a protection layer 1101-3 and a detecting device 1102. The light-emitting layer 1101-2 has no dielectricity in this embodiment.

The detecting device 1102 is a capacitive device, and includes three capacitors, i.e., a first capacitor, a second capacitor and a third capacitor, which are distributed in the basic device 1101 dispersedly. Specifically, the first capacitor is distributed on the light-emitting layer 1101-2, the second capacitor is distributed on the protection layer 1101-3, and the third capacitor is distributed under the basic layer 1101-1.

The detecting device 1102 when being triggered transmits to the electronic device information. The information may be a capacitance variation value collected by each capacitor.

At a first time instant, the first capacitor collects a first capacitance, the second capacitor collects a second capacitance, and the third capacitor collects a third capacitance. At a second instant, the first capacitor collects a fourth capacitance, the second capacitor collects a fifth capacitance, and the third capacitor collects a sixth capacitance. The first capacitor obtains a first capacitance variation value based on the first capacitance and the fourth capacitance, the second capacitor obtains a second capacitance variation value based on the second capacitance and the fifth capacitance, and the third capacitor obtains a third capacitance variation value based on the third capacitance and the sixth capacitance. The detecting device 1102 transmits to the electronic device the first capacitance variation value, the second capacitance variation value and the third capacitance variation value. The electronic device determines whether the first capacitance variation value, the second capacitance variation value and the third capacitance variation value are all equal to zero. The determined result is that the first capacitance variation value, the second capacitance variation value and the third capacitance variation value are all equal to zero. At a third time instant, the first capacitor collects a seventh capacitance, the second capacitor collects an eighth capacitance, and the third capacitor collects a ninth capacitance. The first capacitor obtains a fourth capacitance variation value based on the seventh capacitance and the fourth capacitance (or the first capacitance), the second capacitor obtains a fifth capacitance variation value based on the eight capacitance and the fifth capacitance (or the second capacitance), and the third capacitor obtains a sixth capacitance variation value based on the ninth capacitance and the sixth capacitance (or the third capacitance). The detecting device 1102 transmits to the electronic device the fourth capacitance variation value, the fifth capacitance variation value and the sixth capacitance variation value. The electronic device determines whether the fourth capacitance variation value, the fifth capacitance variation value and the sixth capacitance variation value are all equal to zero. The determined result is that the fourth capacitance variation value is zero, and the fifth capacitance variation value and the sixth capacitance variation value are both not equal to zero, then it can be determined that the capacitance at the detecting point on the flexible screen is varied, and that the flexible screen is bent. The electronic device can determine the bent state of the flexible screen based on the fifth capacitance variation value and the sixth capacitance variation value.

Sixth Example

The electronic device is connected to the flexible screen in a wired manner, and the flexible screen is provided on the electronic device. The flexible screen includes a basic layer 1101-1, a light-emitting layer 1101-2, a protection layer 1101-3 and a detecting device 1102. The light-emitting layer 1101-2 has dielectricity in this embodiment.

The detecting device 1102 is a capacitive device, and includes three capacitors, i.e., a first capacitor, a second capacitor and a third capacitor, which form a detecting layer. The detecting layer is provided under the basic layer 1101-1, due to the dielectricity of the light-emitting layer 1101-2.

The detecting device 1102 transmits in real time to the electronic device information. The information may be a capacitance collected by each capacitor.

At a first time instant, the detecting device 1102 transmits to the electronic device a first capacitance collected by the first capacitor, a second capacitance collected by the second capacitor and a third capacitance collected by the third capacitor. At a second time instant, the detecting device 1102 transmits to the electronic device a fourth capacitance collected by the first capacitor, a fifth capacitance collected by the second capacitor and a sixth capacitance collected by the third capacitor. The electronic device determines whether the fourth capacitance is equal to the first capacitance, whether the fifth capacitance is equal to the second capacitance, and whether the sixth capacitance is equal to the third capacitance. If each of the result of the above three determinations is equal, it can be determined that the flexible screen is not bent. At a third time instant, the detecting device 1102 transmits to the electronic device a seventh capacitance collected by the first capacitor, an eighth capacitance collected by the second capacitor and a ninth capacitance collected by the third capacitor. The electronic device determines whether the seventh capacitance is equal to the fourth capacitance (or the first capacitance), whether the eighth capacitance is equal to the fifth capacitance (or the second capacitance), and whether the ninth capacitance is equal to the sixth capacitance (or the third capacitance). If any one of the result of the above three determinations is unequal, it can be determined that the flexible screen is bent, and the bent angle of the flexible screen can be determined based on the capacitance variation values.

In the embodiment of the invention, the flexible screen includes a basic device and a detecting device. The basic device includes a basic layer and a light-emitting layer applied on the basic layer. The detecting device is provided on the basic device or in the basic device, and is adapted to detect at least one parameter value when the flexible screen is bent. The at least one parameter value may be a parameter value used to determine a bent state of the flexible screen. The flexible screen according to the embodiment of the invention includes a detecting device adapted to detect at least one parameter value when the flexible screen is bent. Based on the at least one parameter value, the bent state of the flexible screen can be determined, and the work efficiency and the accuracy of the judgment can be improved. Further, the flexible screen can be configured to output different contents based on different bent states of the flexible screen, the quality of the output is improved, and the user's experience is facilitated.

The detecting device can be a piezoelectric device, a capacitive device, or any other device that can be used to implement the solution of the invention. The bent state of the flexible can be detected by detecting the pressure variation value or the capacitance variation value, and there are many ways for the detection.

The piezo films or the capacitors can be distributed in the flexible screen dispersedly, or can form a detecting layer in the flexible screen, as required in practice.

The solution of the device or system corresponds to the solution of the method substantially, and reference for the related points can be made to the description in the embodiment of the method. The device or system described above is only for illustration. Specifically, the units described as separated components can be or can not be separated physically, the component illustrated as a unit can be or can be not a physical unit, that is, can be provided in one position or can be distributed onto multiple network units. Some or all of the modules can be selected to implement the embodiment of the invention as required in practice. The embodiment can be understood and implemented by those skilled in the art without creative labor.

In the embodiments according to the invention, it should be understood that the disclosed system, device and method can be implemented in other ways without deviating from the spirit and scope of the application. The described embodiments are only for illustration but not mean to limit the application. For example, the division of the unit or sub-unit is only a logical function division, and other division manners are possible in practice, for example, multiple units or multiple sub-units are combined. Further, multiple units or components can be combined or integrated into another system, or some features can be omitted or not performed.

With the above description of the embodiment of the method, it can be clearly understood by those skilled in the art that the invention can be implemented in software in addition to necessary general purpose hardware platform, and can also be implemented in hardware, with the former being better in most cases. Based on such understanding, the technical solution of the invention or a part of the technical solution of the invention that contributes to the prior art can be essentially embodied in a form a software product which is stored in a storing medium, including several instructions for causing a computer device (which can be a personal computer, a server, a network device or the like) to execute all or a part of the steps of the method described in the embodiments of the invention. The storing medium includes various medium that can store a program code, such as a Read-Only Memory (ROM), a Random Access Memory (RAM), or a disk an optical disk.

Apparently, various alternations and variations of the invention can be made by those skilled in the art without deviating from the spirit and scope of the invention. Therefore, if those alternations and variations of the invention fall within the scope of the claim of the invention and the equivalent, the invention is intended to contain those alternations and variations.

The invention claimed is:

1. A method for determining a bent state of an electronic device, the electronic device comprising a flexible screen and a detecting device, the method comprising:
obtaining at least one parameter value, wherein the at least one parameter value is obtained by the detecting device in the case that the flexible screen is bent; and
determining a bent state of the flexible screen based on the at least one parameter value;
wherein the electronic device further comprises a display unit, and the detecting device is one or more sensing units;
the obtaining at least one parameter value comprises:
obtaining data collected by the one or more sensing units; and
determining current state information of the electronic device based on the collected data; and
wherein the method further comprises:
determining first state information of one or more display objects in the display unit;
determining second state information of the display object based on the current state information and the first state information; and
adjusting the state of the display object based on the determined second state information, comprising adjusting a first display attribute information of the display object to a second display attribute information that corresponds to the current state information of the electronic device, wherein both display attribute information are of a same kind of display attribute information which comprises at least one of a display resolution and a color value.

2. The method according to claim 1, wherein the obtaining the at least one parameter value comprises:
obtaining the at least one parameter value in an active manner or a passive manner.

3. The method according to claim 1, wherein the sensing unit is a gravity acceleration sensor;
the collected data comprises sub-acceleration data collected by the gravity acceleration sensor in directions of X-axis, Y-axis and Z-axis respectively, and
the determining the current state information of the electronic device based on the collected data comprises:
determining state information of a corresponding sub-region based on the collected sub-acceleration data; and
determining the current state information of the electronic device based on the state information of a plurality of sub-regions.

4. The method according to claim 1, wherein the display unit comprises a plurality of sub-regions in a rectangular shape; and the sensing unit is provided, wherein the sensing unit is a gravity acceleration sensor,
the collected data comprises sub-acceleration data collected by the gravity acceleration sensor in directions of X-axis, Y-axis and Z-axis respectively; and
the determining the current state information of the electronic device based on the collected data comprises:
determining, based on the collected sub-acceleration data, angles of vertices of a corresponding sub-region with a horizontal plane;
determining state information of the corresponding sub-region based on the determined angles of the vertices of the corresponding sub-region with the horizontal plane; and
determining the current state information of the electronic device based on the state information of the plurality of sub-regions.

5. The method according to claim 1, wherein the state information of a display object is a position point of the display object; and
adjusting a state of one or more display objects based on the determined second state information comprises:
moving the display object from a first position point to a second position point based on the current state information of the electronic device, wherein a movement with respect to the current state information complies with physical laws.

6. The method according to claim 1, wherein the state information of a display object is display attribute information of the display object; and
adjusting a state of one or more display objects based on the determined second state information comprises:
adjusting a first display attribute information of the display object to a second display attribute information that corresponds to the current state information of the electronic device.

7. The method according to claim 1, wherein the display unit comprises three layers including a basic layer, a light-emitting layer and a protection layer, the detecting device comprises a plurality of piezo films arranged on at least two of the three layers respectively.

8. The method according to claim 1, wherein the display unit comprises a plurality of layers, the detecting device also comprises a plurality of layers arranged on the plurality of layers of the display unit.

9. An electronic device, comprising a detecting device and a flexible screen, wherein the electronic device further comprises:
an obtaining module adapted to obtain at least one parameter value, wherein the at least one parameter value is obtained by the detecting device in the case that the flexible screen is bent; and
a determining module adapted to determine a bent state of the flexible screen based on the at least one parameter value;
wherein the detecting device is one or more sensing units, and the electronic device further comprises a display unit and an information processing device;
the information processing device comprises:
a data obtaining module adapted to obtain data collected by the one or more sensing units; and
a current status determining module adapted to determine current state information of the electronic device based on the collected data
wherein the information processing device further comprises:
a first state determining module adapted to determine first state information of one or more display objects in the display unit;
a second state determining module adapted to determine second state information of the display object based on the current state information and the first state information; and
a state adjusting module adapted to adjust the state of the display object based on the determined second state information,
wherein the state adjusting module comprises:
a display attribute adjusting unit adapted to adjust a first display attribute information of the one or more display objects to a second display attribute information that corresponds to the current state information of the electronic device, both display attribute information are of a same kind of display attribute information which comprises at least one of a display resolution and a color value.

10. The electronic device according to claim 9, wherein the obtaining module is adapted to obtain the at least one parameter value in an active manner or a passive manner.

11. The electronic device according to claim 9, wherein the sensing unit is a gravity acceleration sensor,
the data obtaining module comprises:
  a sub-acceleration obtaining unit adapted to obtain sub-acceleration data collected by the gravity acceleration sensor in directions of X-axis, Y-axis and Z-axis respectively; and
the current status determining module comprises:
  a sub-region status determining unit adapted to determine state information of a corresponding sub-region based on the collected sub-acceleration data; and
  an electronic device status determining unit adapted to determine the current state information of the electronic device based on the state information of a plurality of sub-regions.

12. The electronic device according to claim 9, wherein the sensing unit is a gravity acceleration sensor,
the data obtaining module comprises:
  a sub-acceleration obtaining unit adapted to obtain sub-acceleration data collected by the gravity acceleration sensor in directions of X-axis, Y-axis and Z-axis respectively; and
the current status determining module comprises:
  a vertex inclination angle determining unit adapted to determine, based on the collected sub-acceleration data, angles of the vertexes of a corresponding sub-region with a horizontal plane;
  a sub-region status determining unit adapted to determine state information of the corresponding sub-region based on the determined angles of the vertexes of the corresponding sub-region with the horizontal plane; and
  an electronic device status determining unit adapted to determine the current state information of the electronic device based on the state information of a plurality of sub-regions.

13. The electronic device according to claim 9, wherein the information processing device comprises:
a first state determining module comprising:
  a position point determining unit adapted to determine a first position point of one or more display objects in the display unit; and
a state adjusting module comprising:
  a position point adjusting unit adapted to move the one or more display objects from the first position point to a second position point based on the current state information of the electronic device, wherein a movement with respect to the current state information complies with physical laws.

14. The electronic device according to claim 9, wherein the information processing device comprises:
a first state determining module comprising:
  a first display attribute determining unit adapted to determine a first display attribute information of one or more display objects in the display unit; and
a state adjusting module comprising:
  a display attribute adjusting unit adapted to adjust a first display attribute information of the one or more display objects to a second display attribute information that corresponds to the current state information of the electronic device.

15. The electronic device according to claim 9, wherein the display unit comprises a plurality of layers and the detecting device also comprises a plurality of layers arranged on the plurality of layers of the display unit.

16. A flexible screen, comprising a basic device and a detecting device, wherein:
the basic device comprises a basic layer and a light-emitting layer applied on the basic layer; and
the detecting device is provided on the basic device or in the basic device, and is adapted to detect at least one parameter value in the case that the flexible screen is bent, wherein the at least one parameter value is a parameter value used to determine a bent state of the flexible screen;
  wherein the detecting device is one or more sensing units and communicates with an information processing device;
the information processing device comprises:
  a data obtaining module adapted to obtain data collected by the one or more sensing units; and
  a current status determining module adapted to determine current state information of an electronic device based on the collected data;
wherein the information processing device further comprises:
  a first state determining module adapted to determine first state information of one or more display objects in a display unit;
  a second state determining module adapted to determine second state information of the one or more display objects based on the current state information and the first state information; and
  a state adjusting module adapted to adjust the state of the one or more display objects based on the determined second state information,
wherein the state adjusting module comprises:
  a display attribute adjusting unit adapted to adjust a first display attribute information of the one or more display objects to a second display attribute information that corresponds to the current state information of the electronic device, both display attribute information are of a same kind of display attribute information which comprises at least one of a display resolution and a color value.

17. The flexible screen according to claim 16, wherein the basic device further comprises a protection layer applied on the light-emitting layer.

18. The flexible screen according to claim 17, wherein the detecting device is a piezoelectric device adapted to detect a pressure variation value in a bending process of the flexible screen, and
  wherein in the bending process of the flexible screen, the piezoelectric device is adapted to detect a pressure variation value in a bent region and determine a bent state of the flexible screen based on the pressure variation value.

19. The flexible screen according to claim 16, wherein the display unit comprises more than two layers and the detecting device also comprises a plurality of layers arranged on the plurality of layers of the display unit.

20. The flexible screen according to claim 17, wherein the detecting device is a capacitive device adapted to detect a capacitance variation value in a bending process of the flexible screen.

21. The flexible screen according to claim 20, wherein in the bending process of the flexible screen, the capacitive device is adapted to detect a capacitance variation value in a bent region and determine a bent state of the flexible screen based on the capacitance variation value.

22. The flexible screen according to claim 20, wherein:
the capacitive device comprises a nanometer first Indium Tin Oxide (ITO) layer with positive charges and a second nanometer ITO layer with negative charges;
if the light-emitting layer has no dielectricity, the first ITO layer and the second ITO layer are applied in any position on the basic layer; and
if the light-emitting layer has dielectricity, the first ITO layer and the second ITO layer are applied under the basic layer.

* * * * *